(12) United States Patent
Wei

(10) Patent No.: US 11,314,149 B2
(45) Date of Patent: Apr. 26, 2022

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 280 days.

(21) Appl. No.: 16/529,800

(22) Filed: Aug. 2, 2019

(65) Prior Publication Data
US 2020/0050081 A1 Feb. 13, 2020

(30) Foreign Application Priority Data
Aug. 10, 2018 (CN) .......................... 201821303992.5

(51) Int. Cl.
G03B 11/04 (2021.01)
G02B 13/00 (2006.01)

(52) U.S. Cl.
CPC ........ *G03B 11/045* (2013.01); *G02B 13/0015* (2013.01)

(58) Field of Classification Search
CPC .......................... G02B 13/0015; G03B 11/045
See application file for complete search history.

(56) References Cited

U.S. PATENT DOCUMENTS

| 5,221,993 A | 6/1993 | Kaisha | |
|---|---|---|---|
| 2010/0158510 A1* | 6/2010 | Jannard | G03B 17/14 396/533 |
| 2015/0131175 A1* | 5/2015 | Lamontagne | G02B 7/026 359/830 |
| 2018/0176431 A1* | 6/2018 | Kim | H05K 1/0201 |
| 2019/0394369 A1* | 12/2019 | Huo | H04N 5/2257 |

FOREIGN PATENT DOCUMENTS

| CN | 206339752 U | 7/2017 |
|---|---|---|
| JP | A1995325243 B2 | 12/1995 |
| JP | 2009186906 A | 8/2009 |
| JP | 2010186157 A | 8/2010 |
| JP | 2012226317 A | 11/2012 |

OTHER PUBLICATIONS

1st Office Action dated Jul. 27, 2020 by JPO in related Japanese Patent Application No. 2019-129520 (3 Pages).

* cited by examiner

*Primary Examiner* — Clayton E. LaBalle
*Assistant Examiner* — Diana Hancock
(74) *Attorney, Agent, or Firm* — W&G Law Group

(57) ABSTRACT

The present disclosure provides a lens module. The lens module includes a lens barrel provided with a light through hole and defining a receiving space; a lens group having a plurality of lenses and disposed in the receiving space; and a pressing ring disposed on an image side of the lens group. The plurality of lenses has a common optical axis. The lens barrel includes an inner side surface facing the optical axis. The inner side surface is provided with a plurality of extinction structures surrounding both the pressing ring and a lens of the plurality of lenses closest to the image side. The plurality of extinction structures is arranged in sequence in a direction from the object side towards the image side. Each of the plurality of extinction structures extends from the inner side surface towards the optical axis and has a triangular cross section.

11 Claims, 2 Drawing Sheets

ND MODULE

TECHNICAL FIELD

The present disclosure relates to the field of optical imaging technology, and more particularly, to a lens module for an electronic device such as a camera, a video camera, a mobile phone, a tablet computer and a laptop computer.

BACKGROUND

In recent years, with the development of imaging technology and the rise of electronic products with imaging functions, optical lens modules have been widely used in various products and have been continuously improved and optimized. At present, the improvement direction of most lens modules lies in how to make the lens module smaller and thinner, how to select suitable lenses with good optical characteristic compatibility while making the lens module smaller and thinner, and how to combine the lenses together to ensure a better imaging effect.

However, the inventors of the present disclosure have found that in the process of imaging, the light incident on the lens module from various angles is extremely easy to form stray light interference, which has a great influence on the imaging quality of the lens module. At present, although there are measures to reduce the light reflection at the light entrance of the lens module, the stray light formed by the light incident on the inside of the lens module through multiple reflections still reduces the imaging quality.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present invention will be further illustrated with reference to the accompanying drawings and the embodiments.

Figure 1:
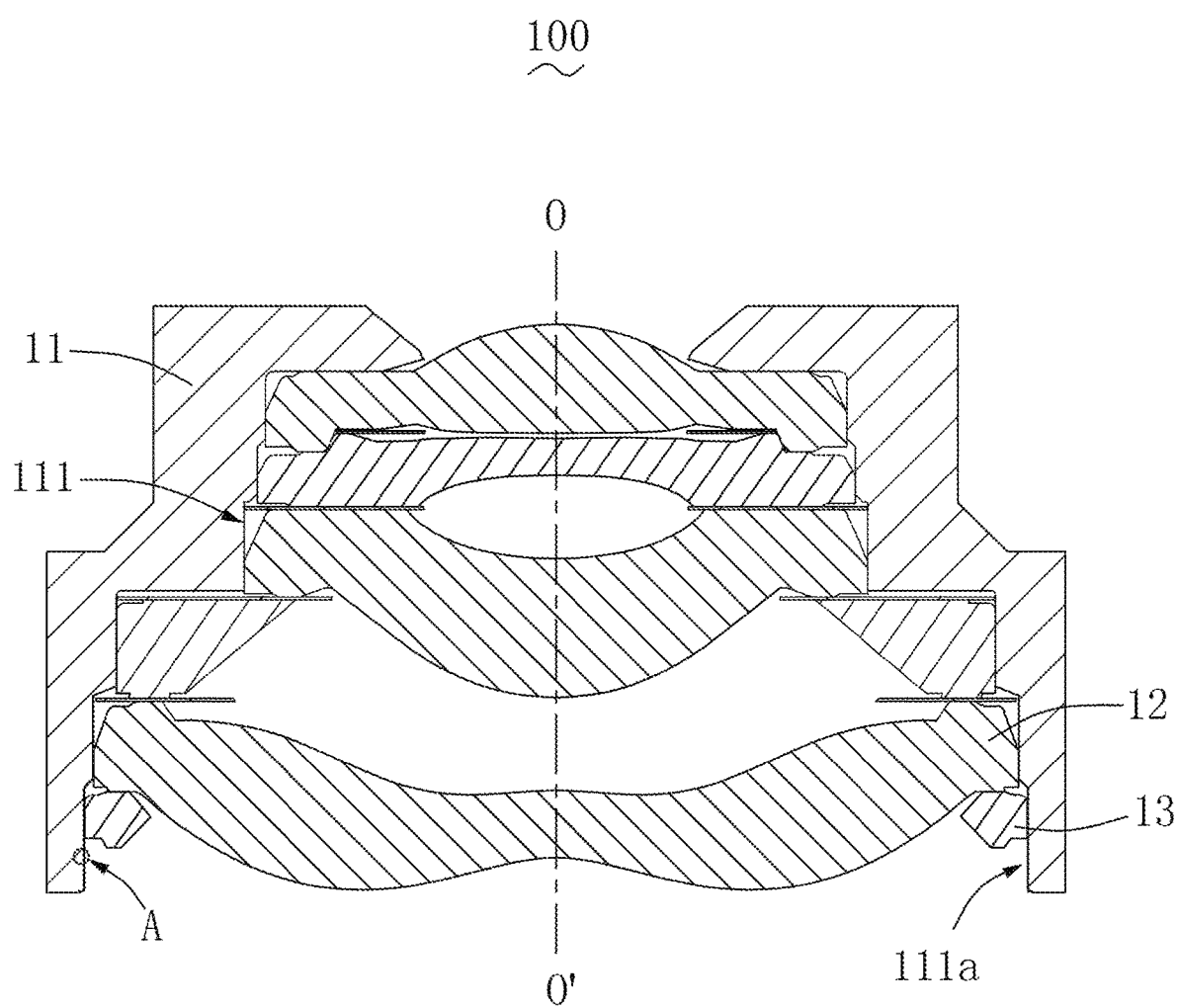
FIG. 1 is a cross-sectional schematic structural view of a lens module according to an embodiment of the present disclosure.
Figure 2:
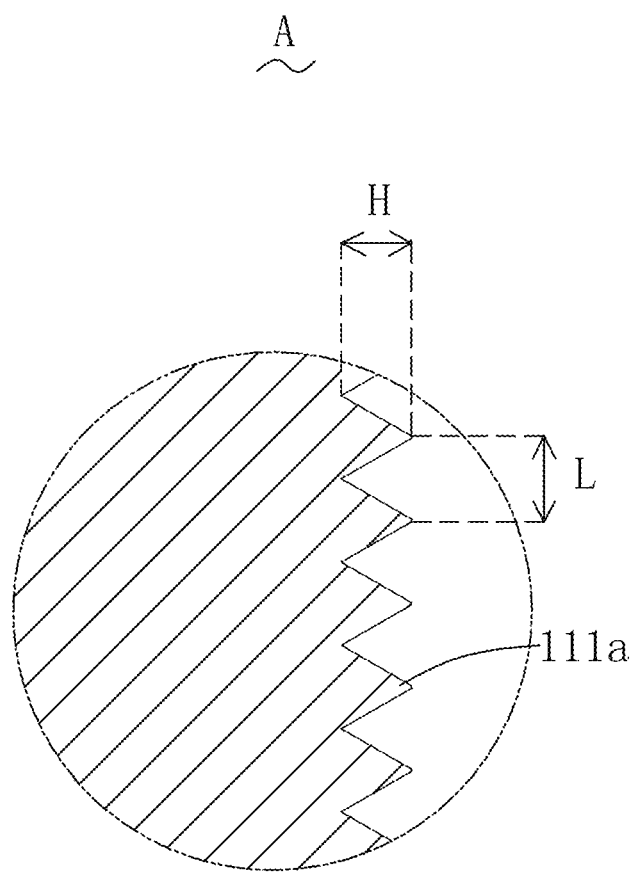
FIG. 2 is an enlarged view of portion A of FIG. 1.

The embodiment of the present disclosure relates to a lens module 100 as shown in FIG. 1 and FIG. 2, including a lens barrel 11 provided with a light through hole 10 and defining a receiving space, a lens group having a plurality of lenses 12 and disposed in the receiving space, and a pressing ring 13 disposed on an image side of the lens group. The plurality of lenses has a common optical axis OO'. The lens barrel 11 includes an inner side surface 111 facing towards the optical axis OO', and the inner side surface 111 is provided with a plurality of extinction structures surrounding the pressing ring 13 and the lens 12 closest to the image side. The plurality of extinction structures 111a is arranged in sequence from the object side towards the image side. The extinction structures 111a extend from the inner side surface 111 towards the optical axis OO' and have a triangular cross section.

In the present embodiment, the inner side surface 111 of the lens barrel 11 is provided with a plurality of extinction structures 111a surrounding the pressing ring 13 and the lens 12 closest to the image side, and the plurality of extinction structures 111a is arranged in sequence from the object side towards the image side and extends from the inner side surface 111 towards the optical axis OO'. The cross section of the extinction structures 111 is triangular, so that the inner side surface 111 of the lens barrel 11 is more roughened by the above extinction structures 111a. When the light is incident on the roughened inner side surface 111, the light is not easy to be reflected by the roughened surface to form stray light, which would interfere with the imaging of the lens module 100. That is, by increasing the roughness on the inner side surface 111 at the pressing ring 13 and the lens 12 close to the image side, the reflected stray light inside the lens barrel 11 is weakened, thus improving the imaging quality.

It is worth mentioning that the roughened inner side surface 111 has a greater frictional force. The extinction structures 111a on the inner side surface 111 surrounding the pressing ring 13 and the lens 12 closest to the image side can increase the clamping force for the pressing ring 13 and the lens 12 by the greater frictional force. Finally, the pressing ring 13 and the lens 12 are favorable to be firmly mounted, so that the pressing ring 13 and the lens 12 are stably placed in the receiving space.

In addition, in the present embodiment, the roughened inner side surface 111 is favorable for increasing the gas permeability of the lens module 100.

The implementation details of the present embodiment are specifically described below. The following content is merely for facilitating understanding of the provided implementation details, and is not necessary to implement the solution.

The lens module 100 includes a lens barrel 11, a lens 12, and a pressing ring 13.

The lens barrel 11 defines a receiving space, and a plurality of optical components is disposed in the receiving space, such as the lens 12, the pressing ring 13, and a light shading sheet. A light through hole 10 is defined in one surface of the lens barrel 11 close to the object side, and light on the object side is incident into the lens barrel 11 by the light through hole 10, passes through the lens 12, and is finally imaged on the image side of the lens barrel 11. As shown in FIG. 1, in the present embodiment, the lens barrel 11 includes an inner side surface 111 facing towards the optical axis OO'.

The inner side surface 111 holds an optical component such as the lens 12 disposed inside the lens barrel 11 in a clamping manner, that is, the inner side surface 111 may be in direct contact with the optical component such as the lens 12. In the present embodiment, the inner side surface 111 is further provided with extinction structures 111a. In a region having the extinction structures 111a, the optical component such as the lens 12 is in contact with an end point of the extinction structures 111a close to the optical axis OO'.

Specifically, the extinction structures 111a extend towards the optical axis OO' in a three-dimensional space, and a cross-sectional shape formed by cutting the extinction structures 111a with a plane of the optical axis OO' as a cross section is triangular, as shown in FIG. 2. In the present embodiment, the plurality of extinction structures 111a is provided, and the plurality of extinction structures 111a is sequentially arranged on the inner side surface 111 from the object side towards the image side. Further, the extinction structures 111a may be continuously arranged in the direction from the object side to the image side, or may be arranged at intervals in the direction from the object side to the image side, or may be arranged in other specific manners, which are not limited here, as long as the arrangement manner is selected according to actual needs.

It can be understood that the extinction structures 111a enable the inner side surface 111 to be rougher due to convex microstructures thereof compared to a smooth inner side surface 111, that is, the extinction structures 111a increase the roughness on the inner side surface 111. Thus, when the light is incident on the inner side surface 111 with the extinction structures 111a, the inner side surface 111 does not form strong specular reflection on the light, but forms diffuse reflection by the extinction structures 111a, so as to disperse the reflected light. In this way, the reflected stray light in the lens module 100 which would interfere with the imaging is weakened.

Further, in the present embodiment, the extinction structures 111a are specifically disposed at the pressing ring 13 and the lens 12 closest to the image side, and surround the pressing ring 13 and the lens 12 on the inner side surface 111, that is, when the light is incident on the inner side surface 111 where the pressing ring 13 and the lens 12 are mounted in the lens module 100, the extinction structures 111a on the inner side surface 111 can weaken the reflected stray light. It is worth mentioning that the pressing ring 13 and the lens 12 are close to an image side of the entire lens module 100. Therefore, the extinction structures 111a disposed at the position close to the imaging area are favorable for weakening the stray light nearby the imaging area.

Specifically, the extinction structures 111a may have many structures. For example, the extinction structures 111a may be threads formed on the inner side surface 111, that is, the positions on the inner side surface 111 corresponding to the pressing ring 13 and the lens 12 closest to the image side are threads. The extinction structures 111a may also be annular projections formed on the inner side surface 111, that is, the positions on the inner side surface 111 corresponding to the pressing ring 13 and the lens 12 closest to the image side have multi-turn projections. Further speaking, the multi-turn projections may be a triangular scanning belt on the inner side surface 111. Of course, the extinction structures 111a may also be in other specific structures, which is not limited here, as long as the cross-section thereof is triangular.

Preferably, in the present embodiment, the extinction structures 111a extend towards the optical axis OO', and a tail end close to the optical axis OO' is an arc surface, that is, in the cross section, one end of the extinction structures 111a facing towards the optical axis OO' is a rounded angle. It can be understood that the arc surface is relatively smooth, and the arc surface is beneficial for protecting the optical components such as the lens 12 and the pressing ring 13 inside the lens barrel 11 compared with a sharp structure, so that the optical components such as the lens 12 and the pressing ring 13 are prevented from being scratched. Of course, the arc surface is only a preferred embodiment, and does not limit the solution in other embodiments. The tail end of the extinction structure 111a close to the optical axis OO' may also be a pointed angle structure or other structures, which are not enumerated.

In the present embodiment, an extending length of the plurality of extinction structures 111a towards the optical axis OO' is equal, and a distance between tail ends of any two adjacent extinction structures 111a close to the optical axis OO' is equal. In order to better illustrate the above structure, in the present embodiment, the above "length" is indicated by "H" and the above "distance" is indicated by "L". Specifically, referring to FIG. 2, the arrangement of the equal length enables the sides of the extinction structures 111a facing towards the optical axis OO' to be flatter. Thus, the extinction structures 111a are less likely to hinder the assembly of the optical components due to the irregular convex structures. Meanwhile, the tail ends of the adjacent extinction structures 111a close to the optical axis OO' have an equal interval, thereby enabling the arrangement of the extinction structures 111a on the inner side surface 111 to be more regular. Compared with other arrangement structures which have different intervals and are more complicated, such arrangement structure is simpler and convenient for production.

For example, in the present embodiment, the extending length of the extinction structures 111a towards the optical axis OO' is in a range from 2 μm to 15 μm, and the distance between the tail ends of any two adjacent extinction structures 111a close to the optical axis OO' is in a range from 2 μm to 15 μm. In the above numerical ranges, the extinction structures 111a can effectively perform extinction of light inside the lens barrel 11 without hindering the assembly of the optical components in the lens barrel 11. It is to be understood that the above data is only one embodiment, and does not limit the solution in other embodiments. In other embodiments, the extending length and the distance between the tail ends of the extinction structures 111a may be other values, and are not enumerated here.

The lens 12 is configured for optical imaging. In the present embodiment, the plurality of lenses 12 forms a lens group and is received inside the lens barrel 11. The lens 12 also has an optical axis OO'. In the present embodiment, the lens group has a common optical axis OO'.

Specifically, the lenses 12 can be divided into convex lenses and concave lenses. The convex lens has a positive focal length, and the concave lens has a negative focal length. There are many specific values of the focal length, which are not enumerated here. In practical application, according to the optical parameters such as focal lengths of respective lenses 12, the lenses 12 are selected and matched into a lens group having required optical parameters, which is not limited herein. In addition, the lens 12 can be a glass lens or a plastic lens. The glass lens has the advantages of wear resistance, and non-deformation, the plastic lens has the advantage of low cost, and the specific lens can be selected according to actual needs and is not limited herein. In addition, the number of the lenses 12 may be one, two, three, four, five, etc. In the present embodiment, four lenses 12 are selected. It can be understood that it is only one embodiment and does not limit the solution. In other embodiments, the solution may also have other numbers of lenses 12, which are not enumerated here.

The pressing ring 13 is annular and disposed on the image side of the lens 12 closest to the image side in the lens group. The pressing ring 13 presses the optical component such as the lens 12 inside the lens barrel 11 to fasten the optical component such as the lens 12, that is, the pressing ring 13 plays a role of stabilizing the structure inside the entire lens module 100.

The pressing ring 13 is fixedly connected to the inner side surface 111 of the lens barrel 11. Specifically, the pressing ring 13 may be connected to the inner side surface 111 by an adhesive, or may also be connected to the inner side surface 111 by an embedding manner, or may be connected in other manners. Regardless of which connecting manner is selected, a locking slot for locking the pressing ring 13 may be provided at a position of the inner side surface 111 corresponding to the pressing ring 13, which is not limited herein, as long as the pressing ring 13 can be firmly fixed to the inner side surface 111. In addition, the pressing ring 13 may be a metal or plastic pressing ring, and is not limited herein.

Those of ordinary skill in the art can understand that the above embodiments are specific embodiments for implementing the present disclosure. In actual application, various changes can be made in form and detail without departing from the spirit and scope of the present disclosure.

The invention claimed is:

1. A lens module, comprising:
a lens barrel provided with a light through hole and defining a receiving space;
a lens group having a plurality of lenses and disposed in the receiving space; and
a pressing ring disposed on an image side of the lens group,
wherein the plurality of lenses has a common optical axis, the lens barrel comprises an inner side surface facing the optical axis, the inner side surface is provided with a plurality of extinction structures surrounding both the pressing ring and a lens of the plurality of lenses closest to the image side, the plurality of extinction structures is arranged in sequence in a direction from the object side towards the image side, and each of the plurality of extinction structures extends from the inner side surface towards the optical axis and has a triangular cross section;
wherein the inner side surface forms diffuse reflection by the extinction structures when light is incident on the inner side surface so as to disperse the reflected light; the extinction structures weaken the reflected stray light in the lens module.

2. The lens module as described in claim 1, wherein the plurality of extinction structures is threads formed on the inner side surface.

3. The lens module as described in claim 1, wherein the plurality of extinction structures is a plurality of annular projections formed on the inner side surface.

4. The lens module as described in claim 2, wherein a tail end, close to the optical axis, of each of the plurality of extinction structures is an arc surface.

5. The lens module as described in claim 3, wherein a tail end, close to the optical axis, of each of the plurality of extinction structures is an arc surface.

6. The lens module as described in claim 1, wherein each of the plurality of extinction structures has an equal extending length towards the optical axis.

7. The lens module as described in claim 6, wherein the extending length towards the optical axis is in a range from 2 μm to 15 μm.

8. The lens module as described in claim 6, wherein a distance between tail ends, close to the optical axis, of any two adjacent extinction structures of the plurality of extinction structures close to the optical axis is equal.

9. The lens module as described in claim 8, wherein the distance is in a range from 2 μm to 15 μm.

10. The lens module as described in claim 1, wherein the plurality of extinction structures is continuously arranged in a direction from the object side towards the image side.

11. The lens module as described in claim 1, wherein the plurality of extinction structures is arranged at intervals in a direction from the object side towards the image side.

* * * * *